United States Patent [19]

Jacoby et al.

[11] Patent Number: 4,544,963
[45] Date of Patent: Oct. 1, 1985

[54] READ SIGNAL DETECTION IN TERNARY 3PM MAGNETIC RECORDING

[75] Inventors: George V. Jacoby, Los Altos; Allan A. Schwartz, San Jose, both of Calif.

[73] Assignee: Sperry Corporation, New York, N.Y.

[21] Appl. No.: 571,392

[22] Filed: Jan. 16, 1984

[51] Int. Cl.$^4$ .............................................. G11B 5/09
[52] U.S. Cl. ..................................................... 360/40
[58] Field of Search ............................. 360/39, 40, 43

[56] References Cited

U.S. PATENT DOCUMENTS 4,245,263  1/1981  Rathbun et al. ...................... 360/43
4,260,952  4/1981  Thomas, Jr. ........................... 360/43

Primary Examiner—Vincent P. Canney
Attorney, Agent, or Firm—John B. Sowell; Thomas J. Scott; Marshall M. Truex

[57] ABSTRACT

Circuitry for distinguishing each value in a read signal magnetically recorded in ternary-3 position modulation in which the values 1, 2 and 0 are detected and equalized into a singlet, a doublet and absence of magnetic flux change. The circuitry first determines the position locations of each singlet peak and doublet crossover point to establish proper timing of the output signals and then identifies the particular type of signal appearing at the timing points in the read signal sequence. Singlets are identified by the much greater amplitudes in the integrated read signal. Doublets are identified as waveforms having slopes at zero crossovers that correspond in polarity to that of the previous singlet. A novel detector circuit is provided that can correctly identify doublets in a code sequence, irrespective of the presence of a previous singlet, when a recording rule is followed that includes the insertion of a number of consecutive ternary 0 symbols into the recorded signal.

19 Claims, 9 Drawing Figures

|   | S1 | S2 | CC | DD | $\overline{Q}_{106}$ | $Q_{102}$ | P |
|---|----|----|----|----|----|----|---|
| 1 | 1  | 0  | -  | -  | 1  | 1  | 1 |
| 2 |    |    | -  | 1  | 1  | 1  | 1 |
| 3 |    |    | 1  | -  | 0  | 1  | 0 |
| 4 | 0  | 1  | -  | -  | 1  | 0  | 0 |
| 5 |    |    | 1  | -  | 1  | 0  | 0 |
| 6 |    |    | -  | 1  | 1  | 1  | 1 |

READ SIGNAL DETECTION IN TERNARY 3PM MAGNETIC RECORDING

CROSS-REFERENCE TO RELATED APPLICATIONS

The invention disclosed herein is closely related to that disclosed in an application Ser. No. 260,248, filed May 5, 1981 entitled "Ternary Data Encoding System".

BACKGROUND OF THE INVENTION

This invention relates generally to the detection and processing of magnetically recorded digital data and particularly to a novel method and circuitry for accurately distinguishing the values of each read signal magnetically recorded in ternary 3-position modulation.

The 3-position modulation (3PM) system is described in detail in U.S. Pat. No. 4,323,931, issued April 6, 1982 to George V. Jacoby. Very briefly, the 3PM recording system is a self-clocking system that transforms a binary data word of, for example, three data bits into a bit stream that will be recorded in six positions or detents occupying the same track length of the three-bit binary word but with magnetic flux reversals no closer together than three of such detents, or one and one-half data bit lengths. The 3PM encoding technique permits a 50% increase in recorded data or bit densities over that available in NRZ or MFM code recording.

A further 33.3% increase in bit density over those resulting from 3PM encoding, and therefore still greater memory capabilities of a given magnetic memory, is achieved by the ternary 3PM encoding technique described in the copending application Ser. No. 260,248. Briefly, the ternary system employs three values (0, 1, and 2) into which the binary word is translated for recording on the magnetic medium. Thus, for example, a binary word comprising the two digits, 01, may be transformed into the ternary code 020, the digits 10 into ternary 100, and the digits 11 into ternary 200. As with 3PM encoding, ternary 3PM values are adjusted to assure that at least two zeros separate each recorded "1" or "2" so that the read signals representing these values may be readily distinguished. There ternary 3PM values are recorded on the magnetic medium as typical square waveform signals with a ternary "1" represented as a single flux change, a ternary "2" as a square wave pulse of two flux changes per detent, and a ternary "0" represented by no flux changes. At the very high recording densities, the output waveforms from the read head appear to be almost indistinguishable and incapable of rendering useful data signals, until they are reformed by suitable read equalizer circuits.

This invention is for a method and circuitry for the detection of equalized ternary 3PM analog read signals and the accurate identification of the values represented therein.

BRIEF DESCRIPTION OF THE INVENTION

The ternary 3PM signal detection circuitry includes signal equalization circuits such as those described in U.S. Pat. No. 4,266,204 issued May 5, 1981. These equalizing circuits effectively reform the detected wave shapes distorted by the differentiation of a magnetic transducer into equalized analog wave shapes. The value "0" is represented by the absence of the signal, the value, "1", which was recorded on the magnetic medium as a single current transition or a single flux reversal is detected at the output of the detector equalizer circuit as a single pulse or a singlet that roughly resembles a half cycle of a sine wave with its peak representing the point of magnetic flux reversal on the medium. The ternary value, "2", recorded as a square wave pulse with two magnetic flux reversals per detent, is detected at the output of the equalizer circuit as a full wave sinusoidal-shaped waveform, or doublet, with a point of zero crossover representing the mid-point of the recorded square wave.

The detection circuitry first detects the presence and the location of doublet and singlet wave shapes in a sequence by the detection of their crossover points. The sinusoidal shaped doublet crossover points are readily located with a simple comparator. Singlets, however, must be applied to derivative circuitry that performs its differentiation by a delay and subtraction process for reforming the wave shape into one from which accurate zero crossover detection may be measured. The resulting output from the singlet and doublet locator circuitry provides accurate position information of these wave shapes in a sequence, but cannot distinguish between doublet and singlet signals.

The identification of doublet and singlet waveforms in a sequence is accomplished in two parallel channels, each supplying a gate signal to a position detector which detects the time slot in which the zero crossover of the differentiated singlet or the crossover of the undifferentiated doublet occurs. The output of the position detector is a sequence of binary signals corresponding to the ternary 3PM signals that were originally recorded on the magnetic storage medium.

In the singlet identifier channel, the equalized read signal's absolute value, both singlet and doublet, is integrated to amplify the differences in amplitude between singlets and doublets and the integrator output is compared with a threshold voltage. Integrated singlets have an amplitude greater than the threshold whereas the integrated doublets have a lower amplitude. A minimum 3:1 ratio between integrated singlets and doublets is typical.

In the doublet identifier channel, the equalized analog read signal sequence is digitized and gated with a signal having a high or low state determined by the output of the singlet identifier. This control signal effectively "looks for" doublets with the necessary crossover slopes. The control signal high or low state is gated with a high or low first portion of a doublet before its zero crossover and all ungated doublets are rejected. The resulting signals are then accurately relocated in the output sequence by timing the signals with the doublet position locator signals. The doublet identifier channel also includes novel circuitry that operates to correct the doublet output sequence that may have resulted from a missing or reduced amplitude singlet that fails to produce the signal for gating with the digitized doublet signal sequence.

BRIEF DESCRIPTION OF THE DRAWINGS

In the drawings which illustrate the circuitry and associated waveforms of the invention.

DETAILED DESCRIPTION

Figure 1:
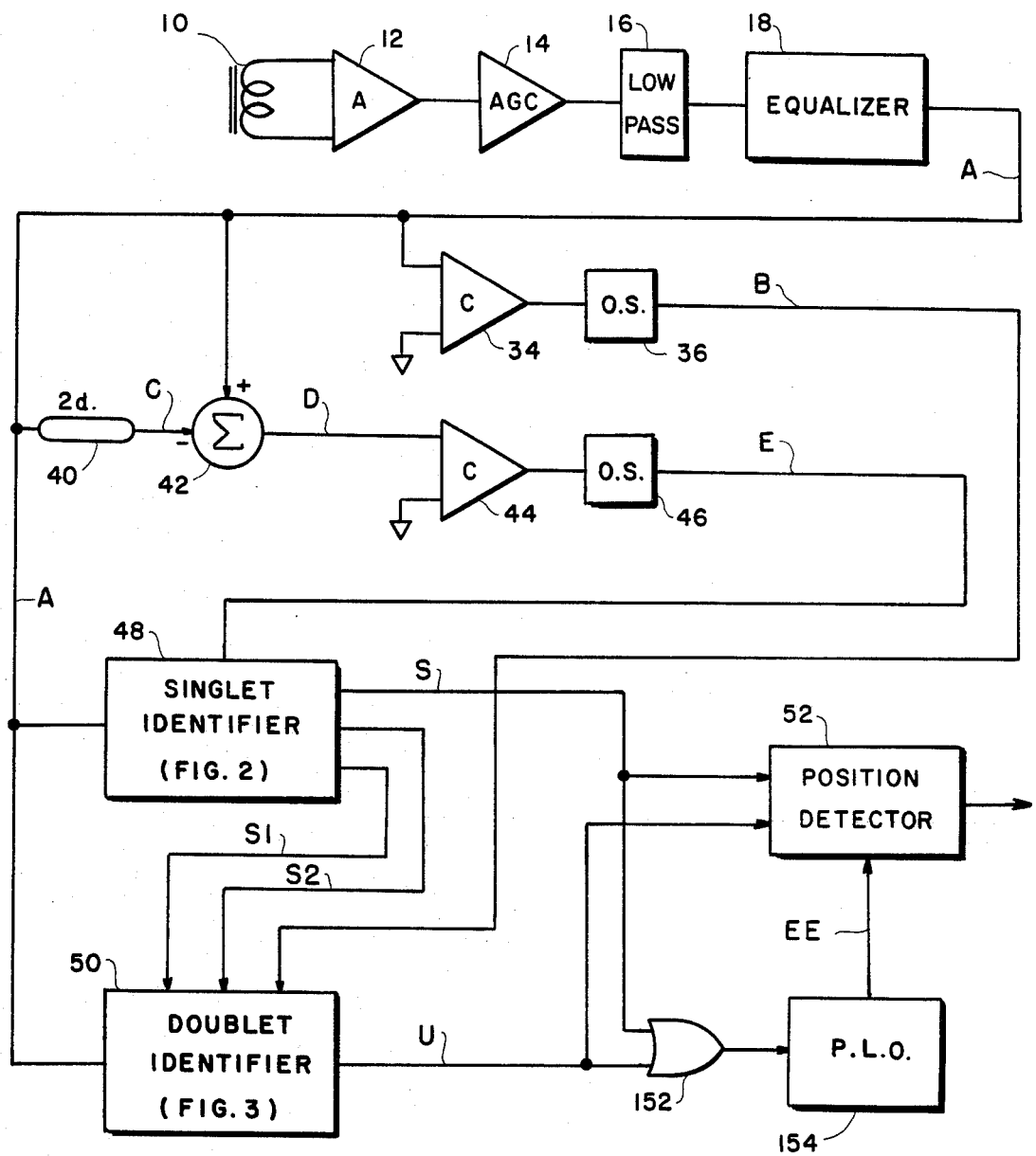
FIG. 1 is a block circuit diagram of the ternary 3PM detector circuitry.

The detection circuitry illustrated in the block diagram of FIG. 1 includes a transducer or read head 10 that converts the magnetic flux variations in a moving magnetic medium into minute electrical signals that are amplified by a preamplifier 12 and applied through an automatic gain control circuit 14 to a low pass filter 16 and thence to an equalizer 18. The equalizer 18 is preferably the well-known cosine-squared circuit, such as described in U.S. Pat. No. 4,081,756 issued Mar. 28, 1978, and functions to reform the input waveform that was distorted by the inherent differentiation of the read head 10.

Figure 5:
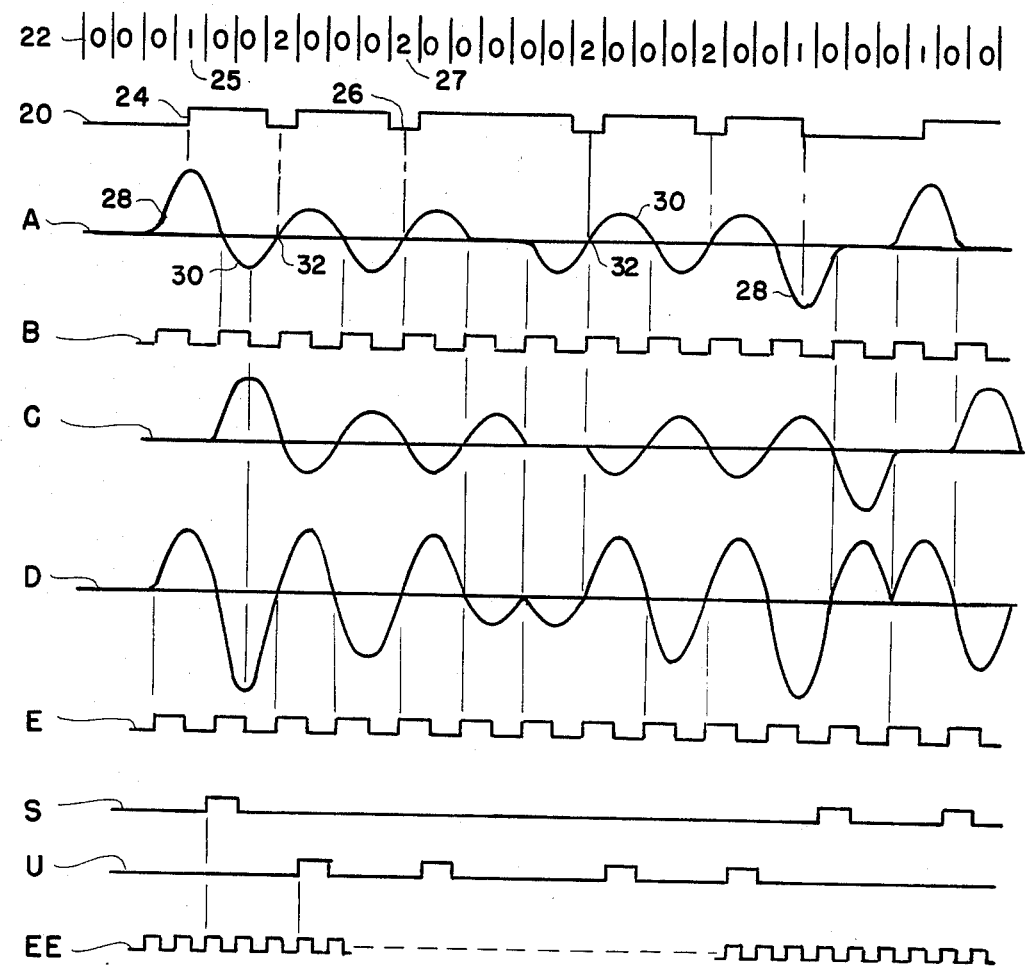
FIG. 5 is an illustration of typical waveforms occurring at various points indicated in the circuitry of FIG. 1.

FIG. 5 illustrates the waveforms associated with the recording of the ternary 3PM signals and the waveforms at various points in the detection circuitry of FIG. 1. The square waveforms in the sequence 20 represent the recorded signals of the ternary 3PM values indicated in the line 22. It will be noted that the recorded waveform representing the value "1" is a single magnetic flux change 24 occurring at the center of the corresponding detent 25. The value "2" is a double flux change 26 within the boundaries of its corresponding detent 27 and the value "0" is represented by the absence of flux change.

The equalizer 18 of FIG. 1, responding to the magnetic flux changes sensed by the read head 10, generates output signals in accordance with the waveform sequence A of FIG. 5. It will be noted that the single flux reversals 24 in the recorded sequence 20 appear in the equalized waveform sequence A as singlets 28 that extend only from one side of the zero base or abscissa axis, each singlet having a peak position or location that corresponds to the position of its respective flux change. It will also be noted that the double flux reversals within the boundaries of one detent in the recorded sequence 20 appear in the equalized sequence A as sinusoidally-shaped doublets 30, each having a crossover point 32 aligned with the center of its corresponding detent 27. A doublet is, of course, the resultant of two singlets each responding to the flux reversals at the beginning and end of its detent.

The equalized signal sequence A of separated doublets and singlets is applied to doublet and singlet position locator circuits which detects the center locations of each detent containing singlets and doublets by detecting the zero crossover points of the doublets and the peak location of the singlets. To detect the crossover points 32 of the doublets 30, the waveform sequence A is applied to a comparator 34 which compares the input signal with a zero reference to produce an output signal whenever the equalized signal crosses the zero base axis. The output of comparator 34 is applied to a one-shot multivibrator 36 which generates an output pulse having a period of approximately one detent at each crossover point. The leading edges of the square wave signals B of FIG. 5 represent the crossover points of all doublets in the waveform sequence A. Unfortunately, the pulse output of the one-shot 36 represents all crossover points of the waveform sequence A including false crossovers at each end of a doublet and falling between the correct crossover 32.

For proper identification, the output pulses of the pulse stream B from the one-shot 36 will be referred to as doublet position locators inasmuch as they contain position indications of the doublet signals.

As previously mentioned, the peaks of the singlets occur at points corresponding to the center of the recorded detents. The signal peaks are nearly impossible to locate by direct methods; however, peak locations may be determined by an analog differentiation of the waveform and then locating the zero crossover points of the differentiated waveform. Such differentiation is accomplished by delaying the equalized signal sequence, A, by a delay circuit 40 which has a delay corresponding to approximately two detents or the time difference between two peaks of an isolated doublet as illustrated in the waveform sequence A. The output of the delay circuit 40 is the signal sequence C illustrated in FIG. 5, and this waveform is subtracted from the output of equalizer 18 by the differential circuit 42 to produce signal sequence D of FIG. 5. The waveform represented by sequence D is the differential of the equalized waveforms A and when applied through a zero reference comparator 44 and one-shot 46, having a period of approximately one detent, an output pulse sequence, E, is generated. It will be noted that each zero crossover of the differentiated waveform, D, is displaced approximately one detent from the peak location of the singlet in sequence, A, and also that the sequence includes position data relating to doublets as well as the singlets. The pulse sequence, E, does, however, contain all the data necessary for locating the positions of singlets and the pulses are therefore referred to as singlet position locators. As previously mentioned, the locator pulses of sequences B and E of FIG. 5 can properly locate the singlets and doublets in a sequence but cannot distinguish between them.

For identification of the doublets and singlets, the equalized read signal, A, is applied to parallel channels, one of which is singlet identifier 48, the other being a doublet identifier 50. Each identifier generates appropriately timed gating pulses respectively representing singlets and doublets for further coordination by a position detector 52. The singlet identifier 48 is illustrated in detail in the block diagram of FIG. 2 and the doublet identifier 50 is detailed in FIG. 3. The waveforms at various points identified by reference letters in FIGS. 2 and 3 are shown by corresponding reference letters in FIGS. 6 and 7, respectively.

SINGLET IDENTIFIER

Figure 2:
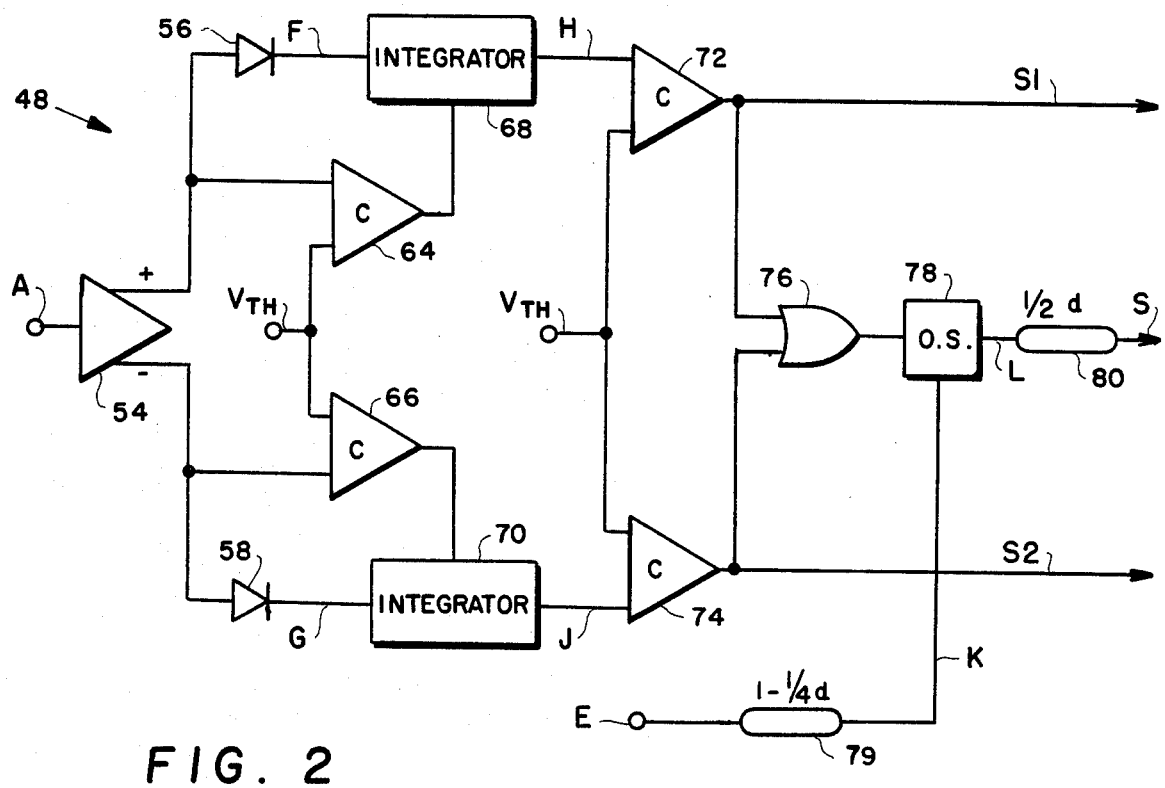
FIG. 2 is a block diagram of the singlet identifier of FIG. 1.
Figure 3:
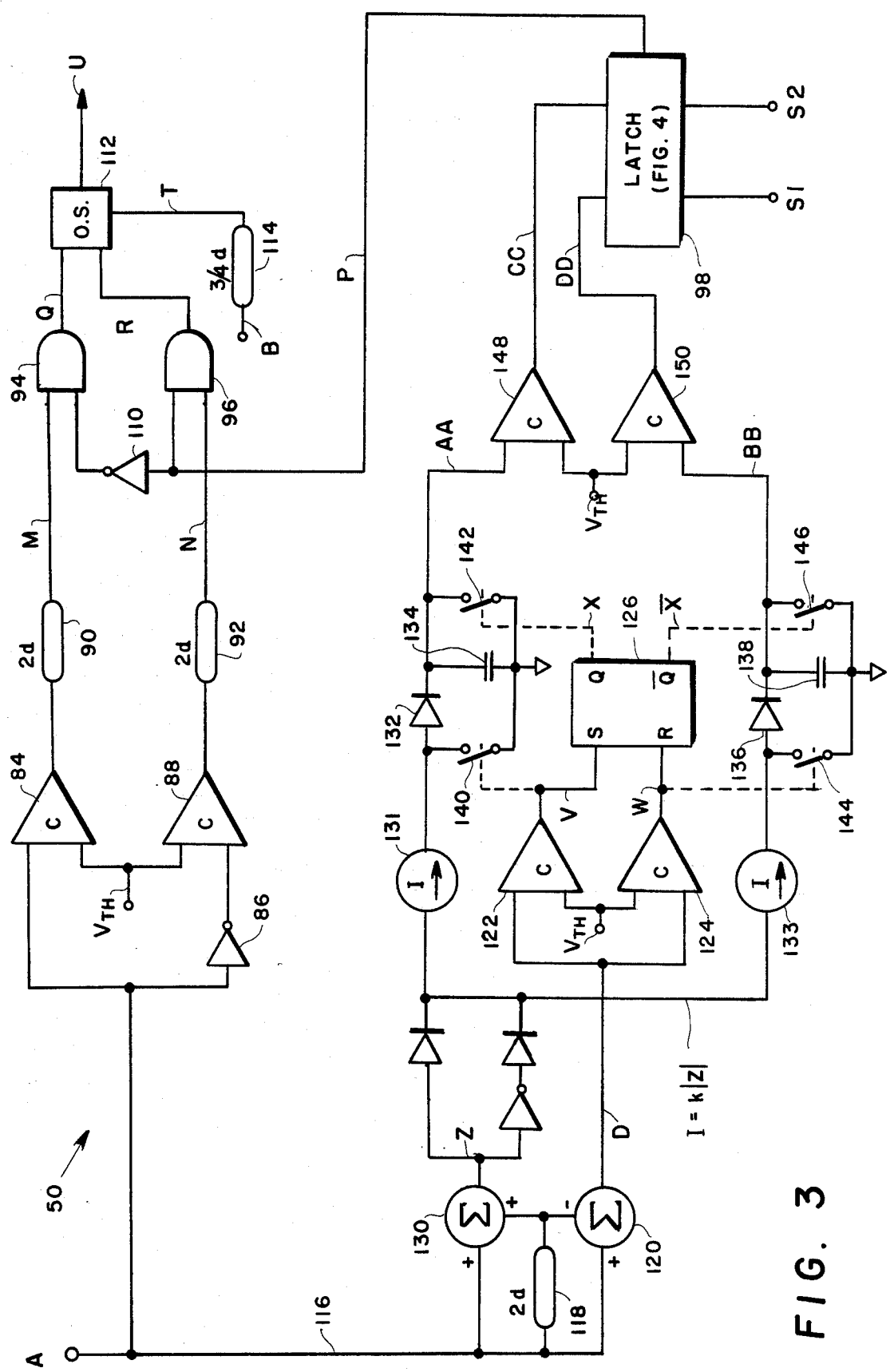
FIG. 3 is a block diagram of the doublet identifier of FIG. 1.

As illustrated in FIG. 2, the equalized analog read input signal, A, is applied to an operational amplifier 54 at the input of the singlet identifier circuitry 48. The amplifier 54 splits the negative and positive portions of the waveform and applies each to a diode rectifier. The diode 56 rectifies the positive side of the amplified read signal A and the diode 58 rectifies the negative side of the signal to produce the signals represented by the waveforms F and G, respectively, of FIG. 6.

Figure 6:
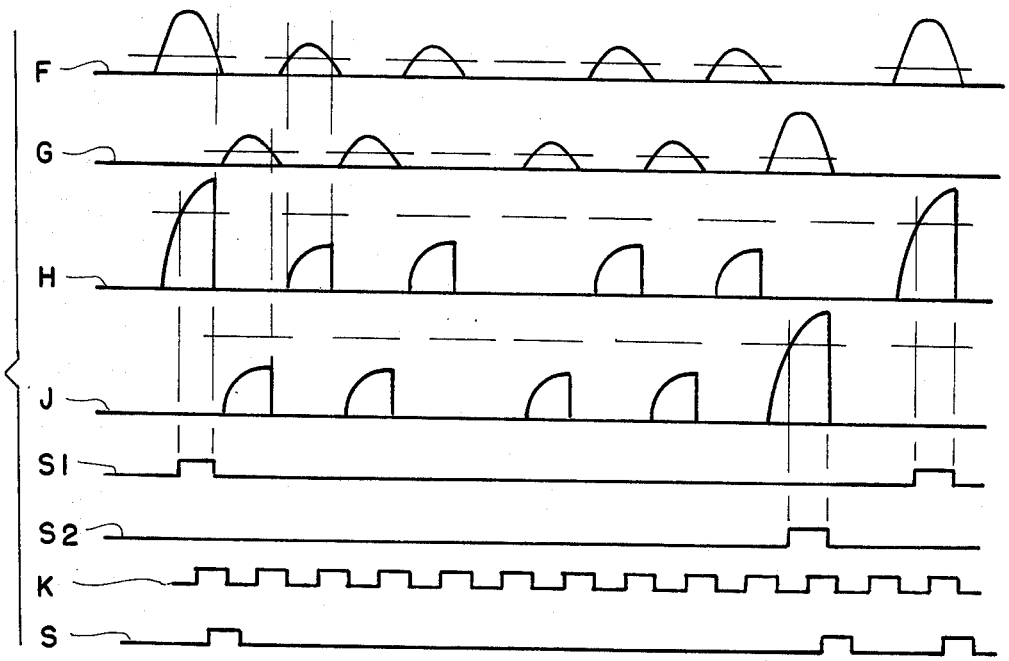
FIG. 6 is an illustration of typical waveforms occurring within the singlet identifier circuitry of FIG. 2.

Positive and negative output signals of the amplifier 54 are also applied to comparators 64 and 66, respectively, each of which receives at their second input terminals a threshold voltage at a leval approximately corresponding to 25% of the amplitude of an isolated singlet as illustrated by the dashed line through the waveforms F and G of FIG. 6. By selecting a threshold voltage of approximately 25% of a singlet amplitude, substantially all noise existing in the equalized read signal sequence A is eliminated. The output from diodes 56 and 58 and the output of the comparators 64 and 66 are respectively applied to analog integrators 68 and 70 which operate to integrate only those portions of their respective input signals F, G, that exceed the noise threshold level established by the comparators 64 and 66. The output of the integrator 68 is represented by the signal H of FIG. 6 and the output of the integrator 70 is shown as signal, J. Note that integration operates to amplify the differences between singlets and doublets.

The output signals H and J from integrators 68 and 70 are applied to comparators 72 and 74, respectively, each of which receive, as an additional input, a threshold voltage at a level of approximately 70% of the amplitude of an integrated isolated singlet, as illustrated by the dashed horizontal lines through waveforms H and J of FIG. 6. The integrated singlets have a much greater amplitude and area than the integrated doublets so that the 70% threshold level applied to the comparators 72 and 74 will produce output signals from those comparators that represent only singlets. The output signals, S1, from the comparator 72 identify positive-going singlets in the equalized read signal sequence, A, while the output signals, S2, from the comparator 74 identify negative-going singlets. As shown in FIG. 1, the signals S1 and S2 are applied to the doublet identifier 50 and are also applied to the OR-gate 76 of FIG. 2. The output from OR-gate 76 is applied to a one-shot multivibrator 78 which generates output pulses, L, of approximately one detent in length in response to the leading edge of an input trigger pulse, K. This trigger pulse is derived from each singlet position locator pulse, E, of FIG. 5 that is delayed an equivalent of approximately 1¼ detents by the delay line 79 to assure triggering near the center portions of the S1 and S2 pulses. The properly timed output pulses, L, of the triggered one-shot 78 are then delayed approximately one-half detent by delay line 80 to produce singlet identifier output pulses, S, for the position detector circuitry 52 of FIG. 1.

DOUBLET IDENTIFIER

Unlike singlets, doublets could appear to occur at any of three crossover points in a sequence of equalized signals. As mentioned earlier, the pulse output, B, of the one-shot 36 of FIG. 1 represents all crossover points in the equalized read signal sequence, A, including those crossovers occurring at the ends of a doublet and between the correct crossover points of consecutive doublets. It will be noted in the sequence A of FIG. 5 that the correct crossover point 32 of each doublet is on the waveform slope that corresponds to the direction or polarity of the preceding singlet. Thus, if a singlet has a negative polarity, all following doublets will have a negative slope as the waveform crosses the correct crossover point 32 in the zero base line. Similarly, a doublet zero crossover point will occur on the positive slope of all doublets following a singlet of positive polarity. The doublet identifier circuitry of FIG. 3 provides for the identification of the correct zero crossover points by gating circuitry employing, as input signals, the positive and negative singlet identifier signals S1 and S2, respectively, discussed above in connection with FIGS. 2 and 6.

In practice, a problem occasionally occurs that would normally confuse the circuitry identifying the doublet signals; a missing or low amplitude singlet that does not generate the necessary S1 or S2 singlet identifier gating signal. Should such a problem occur, all doublets could be identified at an incorrect crossover point and thus produce an erroneous output of the entire detection system until the next singlet is detected.

The doublet identifier circuitry of FIG. 3 includes a long interval detection circuit which, in conjunction with a recording rule of the ternary 3PM code, confirms or corrects the position, or zero crossover slope of doublets occurring after an intentionally inserted string of ternary zeros in the recorded signal. To effect this correction, a code recording rule requires that if two doublets follow a singlet they should have a minimum total spacing of four detents between their correct zero crossover points, and the third doublet, if present, must be at least five detents away from the previous doublet crossover point. Line 22 of FIG. 5 illustrates a ternary 3PM sequence (10020002000002) that follows the recording rule. The long interval detection system senses the five detent interval and with its one-bit memory, outputs the correct position or slope sign of the third doublet into the doublet identifier circuitry.

Figure 4:
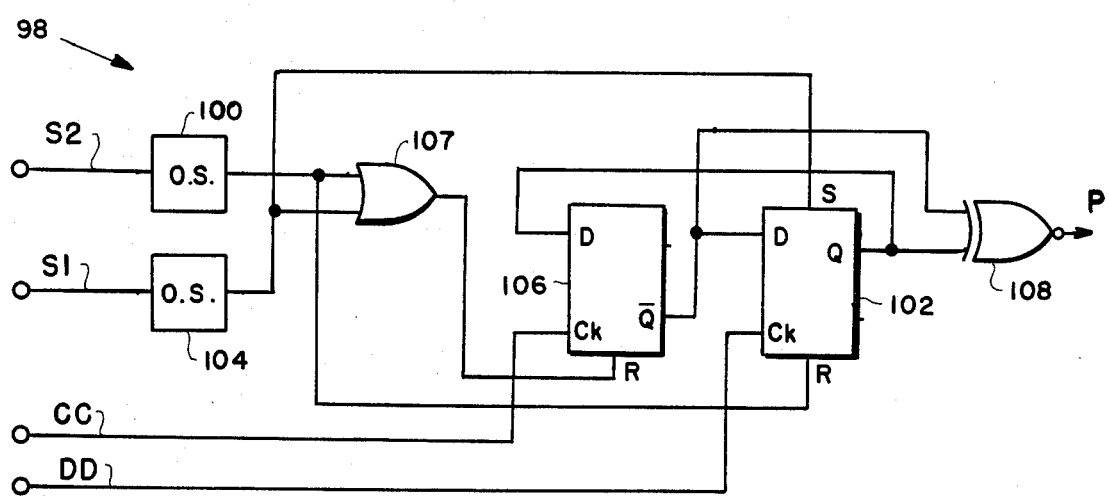
FIG. 4 is a block diagram of a latch illustrated in FIG. 3.
Figure 7A:
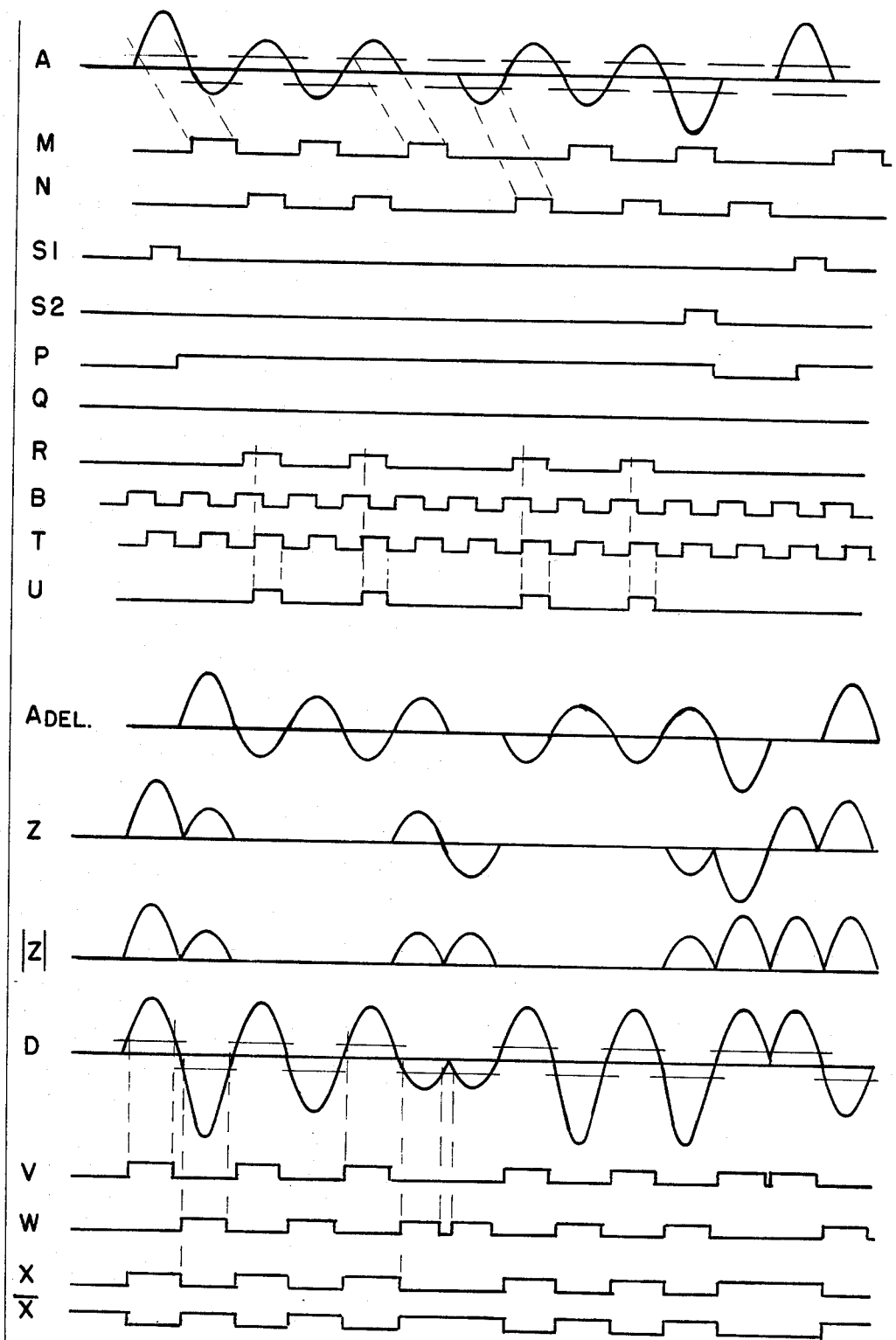
FIG. 7 consisting of 7A through 7D is an illustration of typical waveforms occurring in the doublet identifier circuitry of FIG. 3.
Figure 7B:
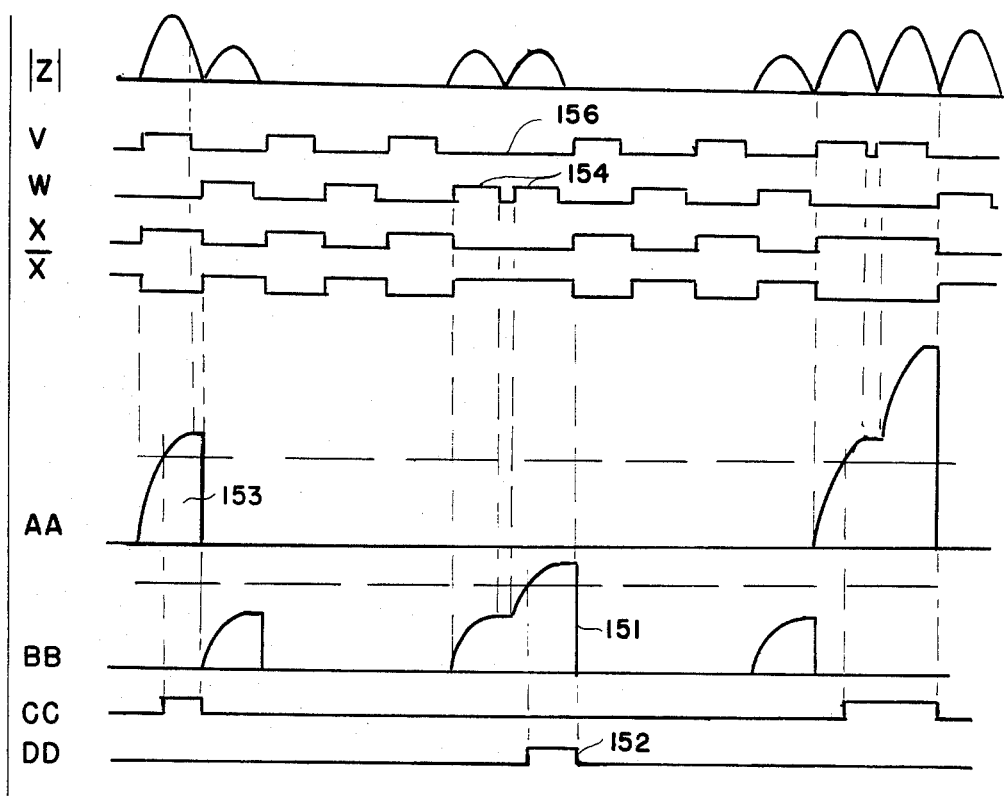

Turning now to FIG. 3 and the accompanying waveform diagram of FIG. 7, the doublet identifier 50 receives the equalized read signal sequence A and applies the signal to a comparator 84 and through an inverter 86 to a second comparator 88. The second input to comparators 84 and 88 is a threshold voltage that equals approximately 25% the amplitude of an isolated singlet to thereby eliminate any noise components from the resulting output signals. The output pulses from the comparators 84 and 88 are each delayed by a time equivalent of approximately two detents by the delay lines 90 and 92 to produce the output pulse sequences M and N, respectively, of FIG. 7. The signal sequence, M, is applied to one input terminal of an AND-gate 94 while the input pulse sequence N is applied to one input terminal of the AND-gate 96. The second input to the AND-gates 94 and 96 is derived from a latch 98, a block diagram of which is illustrated in FIG. 4.

Turning briefly to the block diagram of FIG. 4, the latch circuitry receives input signals S1 and S2 from the singlet identifier of FIG. 2 and also receives set and reset input signals from the long interval detector circuit which will be explained in detail later. For the present, however, it is sufficient to note that the S2 input signal is formed into a one-detent pulse by the one-shot 100 and applied directly to the reset input terminal of a D flip-flop 102. Similarly, the S1 input is formed into a one-detent pulse by the one-shot 104 and applied to the set terminal of the D flip-flop 102. Both of the S1 and S2 signals are applied as inputs to the OR-gate 107, the output of which resets the flip-flop 106 so that its output will always be high after either an S1 or S2 input. The Q output of the flip-flop 102 is applied as one input to an exclusive-OR gate 108 and the $\overline{Q}$ output of the flip-flop 106 is applied as the second input to the gate 108. Therefore, the exclusive-OR gate 108 will produce a high output when S2 resets flip-flop 102 and a low output when the flip-flop 102 is set so that both flip-flops output a high signal. Note, however, that the exclusive-OR output is inverted so that the output signal P is now high when both flip-flops produce identical output levels. Note also that, irrespective of the states of the input signals CC or DD from the long interval detector, the S1 and S2 signals assume priority over the circuit and control the output of the latch 98.

The pulse sequence of S2 and S1 of FIG. 6 have been repeated in FIG. 7 and the output of the latch 98 is indicated by the waveform P. It will be noted that the latch output P switches to a high state following a positive-going singlet, switches to a low state after the negative-going singlet, and again goes to its high state with another positive-going singlet. The latch 98 therefore function as a one-bit memory of the sign of the preceding singlet.

The signal P of FIG. 7 is applied directly to the second input terminal of the AND-gate 96 and through an inverter 110 to the second input terminal of the AND-gate 94.

The output of AND-gate 94 corresponds to the signal M occurring during the low state of the latch input signal P and is illustrated in FIG. 7 as waveform Q. Note that no pulses occur in the waveform Q because the pulses of waveform M occur only during the high state of the latch output signal, P. The output of the AND-gate 96 corresponds to the signal sequence N occurring during the high state of the signal P and is represented in FIG. 7 as the waveform R. The signals Q and R are applied to the one-shot multivibrator 112 which is enabled by either a positive or negative input and which is triggered by the doublet position locator signal B of FIGS. 1 and 5 that indicates the zero crossovers of the analog wave shape A. Signal B has been delayed by a time of approximately three-quarters of a detent by the delay circuit 114 as indicated by the pulse sequence T of FIG. 7. The period of the one-shot 112 is preferably one detent and a doublet identifier output signal, U, of one detent in length is generated whenever positive or negative input pulses, Q or R, respectively, occur at the leading edge of a trigger pulse, T.

To review very briefly, the doublet detector first removes noise from the equalized read signal, A, by applying both singlets and doublets to a 25% noise eliminating threshold. Both negative and positive singlets and doublets are then introduced into gating circuitry which eliminates all singlets. The resulting doublets are thereafter applied to a one-shot which coordinates the signal with the doublet position locator signals, B, so that the output, U, is a pulse sequence containing only properly timed doublets.

The circuitry of FIG. 3, yet to be described, is referred to as the "long interval detector" which, as previously mentioned, operates to correct the positions of doublets following an amplitude reduction or dropout of a singlet which normally identifies the correct zero crossover points of the following doublets. As previously noted, doublets are identified at their zero crossover points and the slope of the doublet at the crossover point must correspond to the polarity of the preceding singlet. Thus, if a singlet is negative, all following doublets will have a negative slope at their proper crossover point. If a singlet is lost or should happen to be read as part of a doublet because of some readout error, the following doublets could not accurately be identified and may mistakenly be identified at the incorrect crossover points of the doublet. The long interval detector recognizes the interval produced by a series of zeros recorded in accordance with the previously discussed ternary 3PM recording rule and, with its one-bit memory in the latch 98, corrects or confirms the sign of the output, P, to the doublet detector gates 94 and 96 of FIG. 3, irrespective of the presence or absence of a preceding singlet.

The long interval detector circuit receives the equalized read signal sequence A through the conductor 116 and applies it to a delay circuit 118 having a delay substantially equal to two detents. The output of the delay circuit 118 is subtracted from the sequence A at the differential circuit 120. It will be noted here that the resulting function is identical with that produced by the delay circuit 40 and differentiator 42 that produces the singlet position locator of FIG. 1 so that the output of the differential circuit 120 of FIG. 3 will generate the same output sequence, D, illustrated in FIG. 5 and repeated in FIG. 7. It should also be noted that since the signal sequence D of FIG. 7 is identical with that of FIG. 6, the output of the differential circuit 120 of FIG. 3 may be employed for generating the single position locator signal. Therefcre, the output of the differential 120 of FIG. 3 may be applied directly to the comparator 44 of FIG. 1 and the delay circuit 40 and the differential 42 of FIG. 1 may thus be eliminated.

Returning to FIG. 3, the output of the differential 120 is applied to the inverting and noninverting input terminals, respectively, of the comparators 122 and 124, each of which receive at their other input terminals a noise-eliminating voltage threshold of approximately 25% of the amplitude of an isolated singlet as illustrated by the dashed horizontal lines in the waveform D of FIG. 7. The output signal, V, of the comparator 122 is applied to the "set" input of the SR flip-flop 126 and the output signal, W, of the comparator 124 is applied to the "reset" input of the flip-flop 126. The true output of the flip-flop is represented by the waveform X of FIG. 7.

The output of the delay circuit 118 is also applied to an adder 130 which adds the delayed signal to the equalized read signal, A, to produce an output signal, Z, as illustrated in FIG. 7. The negative components of the output signal from adder 130 are then inverted and rectified and combined with the rectified positive components to obtain the absolute values, $|Z|$, of the signals which are then converted into corresponding current values by applying the signals to current generators 131 and 133. The absolute values, $|Z|$ of the current representing the signal Z are then integrated by the current integrator comprising the series diode 132 followed by the capacitor 134 shunted to circuit ground, and a second current integrator, including the series diode 136 followed by the shunting capacitor 138.

The anode of the diode 132 is coupled to circuit ground through a switch 140 and the cathode is connected to circuit ground through a second switch 142. Switches 140 and 142 are, of course, transistor switches but are illustrated as mechanical switches for a better understanding of the operation. The switch 140 is normally closed and is opened by a positive or high output from the comparator 122 to permit the integration of the input signal current if such a signal exists at that instant. The true output of the flip-flop 126, X, opens the switch 142 which prevents the discharge of current from the current integrating capacitor 134. The integrating capacitor 134 is discharged by the closing of the transistor switch 142 when the output signal X drops to its low state. The output signal from the current integrator including the capacitor 134 is illustrated in FIG. 7 as the sequence, AA. Here, the waveform 153 corresponds to a singlet in the original sequence.

The current proportional to the absolute value of the signal, Z, is also applied to the identical integrator comprising the series diode 136, the shunting capacitor 138, input shunting switch 144, and discharge shunting switch 146. Switch 144, which is normally closed, is opened by a high output W from the comparator 124 and the discharge switch 146 is opened by a high false output of the flip-flop 126. The output signal from the current integrator comprising the capacitor 138 is illustrated in FIG. 7 as sequence BB. Here, the waveform 151 corresponds to a long interval of zeros in the original sequence. The signal AA from the current integrator is applied to the comparator 148 and the signal BB is applied to a second comparator 150. Each of the comparators receive a high voltage threshold signal having an amplitude of approximately 80% of the full area of a singlet after integrating, as indicated by the horizontal dashed lines in the sequences AA and BB of FIG. 7. The purpose for this very high threshold is to intentionally eliminate all output signals CC and DD from the comparators 148 and 150, respectively, that do not identify either singlets or long intervals.

Briefly reviewing the operation of the detector and referring to the waveform diagrams of FIG. 7, the equalized read signal sequence A is applied to comparators which eliminate any inherent noise in the signal by passing through only that part that exceeds a threshold of about 25% of the amplitude of an isolated singlet. The signals representing the positive and negative components of the sequence A are delayed to produce signals M and N, respectively. These signals are gated with a latch output signal, P, indicative of the sign of the previous singlet to identify the positions of doublets following the singlet. The gate outputs are applied to a one-shot 112 that is triggered by the pulses T derived directly from delayed doublet position locator signals B generated at the zero crossover points of the signal sequence A, and the output of the one-shot is the doublet detector output signal sequence U.

If a singlet, such as singlet 28 in sequence A, is attenuated or even completely missing, all following doublets would normally be incorrectly positioned by the next previous singlet. The doublet identifier circuitry therefore includes the long interval detector circuit which receives the equalized read signal A, delays it by two detents and then adds and subtracts the delayed signal to and from the signal A to respectively produce the sequences Z and D. It will be noted that most of the doublets are cancelled from the Z signal sequence and that the current signals of the absolute value of Z appear only in connection with singlets and with the long interval produced by the series of at least five zeros in sequence A. It is also important to note that the loss of the singlet 28 in sequence A will not affect the generation of the current integration pulse 151 in sequence BB which results in a double current integration of the absolute value of Z during two consecutive integration periods 154 in the waveform W without an intervening reset during the interval 156 of waveform V.

Figure 8:
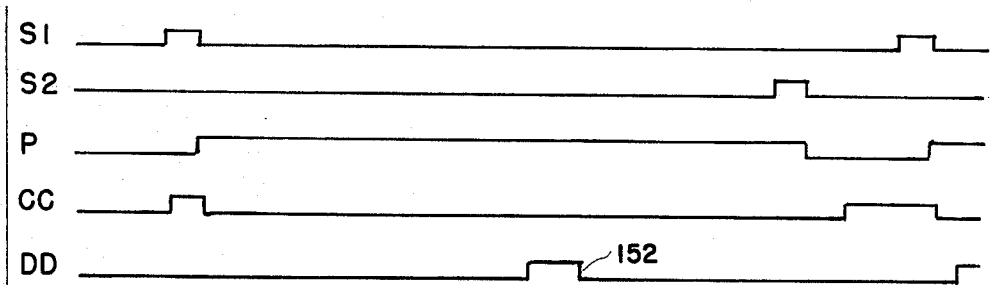
FIG. 8 illustrates input/output waveforms and a truth table of the operation of the latch of FIG. 4.

The signals CC and DD that respectively result from the high threshold applied to the comparators 148 and 150 are applied to the latch 98 of FIG. 4, the operation of which will now be described in conjunction with the previously explained waveforms S1, S2, P, CC, and DD and with a truth table as shown in FIG. 8.

The singlet output signal S1 is transformed into a one-detent long pulse by the one-shot 104 and then applied to the OR-gate 107 and the D.C. "set" terminal of the D flip-flop 102 to produce a high output as shown in the Q102 position #1 of the truth table. The output of the OR-gate 107 is driven high by the appearance of the S1 pulse and is applied to the reset terminal of the flip-flop 106 to produce a high output as shown at $\overline{Q}106$. The outputs of each flip-flop are applied to the exclusive-OR gate 108 which, seeing two high inputs would normally produce a low output, but gate 108 has an inverted output and therefore produces a high output signal, P, as indicated in the truth table. This condition is illustrated in the signal sequences S1 and P of FIG. 8.

Following the switching of the signal P, resulting from the S1 pulse indicating a positive singlet, a DD pulse 152 is produced from the long interval discussed above. The DD pulse 152 is applied as a clocking pulse for the flip-flop 102 and transfers the high signal at its D input to the Q output which, as shown in the truth table, was previously high. Thus, in the example being described, the DD pulse 152 merely confirms the P output produced by the previous S1 pulse. Note that if the singlet that produced the S1 pulse were attenuated or lost from the equalized sequence A, the presence of the DD pulse 152 would operate to switch the P output signal to the same high state established by the singlet S1 signal pulse.

Having now identified and properly timed all singlets and doublets in an equalized read signal, we again refer to the block diagram of FIG. 1 and the accompanying waveforms of FIG. 5. As illustrated in FIG. 1, the singlet identifier signal, S, and the doublet identifier signal, U, are applied to the OR-gate 152, the output of which is applied to a phase locked oscillator 154, the output of which is a timing signal, EE, applied to the position detector 52. The phase locked oscillator 154 operates at twice the recording frequency, or twice that of the locator signals B or E, and is maintained at the correct output frequency and phase by both the S and U signals. The output signals, EE, are applied to the data separator or position detector 52 where the time space between leading edges of the signals, EE, defines windows corresponding to the detents in the sequence 22.

Position detector circuits are old and may be of the type and construction such as shown in U.S. Pat. No. 4,323,931, issued April 6, 1982. The detector 52 may therefore include circuitry that accepts the singlet signals, S, and doublet signals, U, decodes the ternary values through appropriate gating circuits to convert the ternary values into those conventional binary values originally used in the recording circuitry to develop the ternary 3PM code, and then clock out the binary code from a parallel input serial output shift register within the position detector.

What is claimed is:

1. Circuitry responsive to a detected analog read signal for identifying each symbol in a sequence of recorded signals coded in a ternary-3-position modulation in which a ternary 1 symbol is recorded as a single flux reversal at the center of a timing detent and is read as a singlet analog signal, a ternary 2 symbol recorded as two flux reversals within the boundaries of a detent is read as a sinusoidal shaped doublet analog signal, and a ternary 0 symbol is recorded and read as the absence of flux change in a detent, said circuitry including:

receiving means for detecting the read signals of the recorded ternary code and for producing therefrom equalized analog signals containing ternary-3-position modulation symbols;

doublet and singlet position locator circuitry coupled to said receiving means and responsive to said equalized analog signals for detecting the location of the center of each detent identified with a doublet and singlet and for producing a doublet position locator signal and a singlet position locator signal indicative thereof;

singlet identifier circuitry coupled to said receiving means and to said singlet position locator circuitry for identifying each singlet by its amplitude, for correctly timing each identified singlet with said singlet position locator signal, and for generating output signals indicative of said timed singlet and its positive and negative sign; and doublet identifier circuitry coupled to said receiving means, said doublet position locator circuitry, and to said singlet identifier circuitry, said doublet identifier circuitry including control signal producing means responsive to positive and negative sign signals from said singlet identifier for producing a control signal of first and second signs, said doublet identifier circuitry further including gating circuitry responsive to positive and negative excursions of said equalized analog signals and to said control signal for producing timed output pulses indicative of those doublets in said equalized analog signal that have a slope at the center of their respective detent that corresponds in sign to the sign of the previous singlet.

2. The circuitry claimed in claim 1 wherein said receiving means includes a transducer positioned to sense variations representing data on a recording medium and for producing output signals indicative of said variations, preamplifier circuitry coupled to the output of said transducer, and equalizer circuitry coupled to said preamplifier circuitry for reforming distorted waveforms in the output signals of said preamplifier.

3. The circuitry claimed in claim 2 wherein said singlet position locator includes zero reference circuitry coupled to the output of said receiving means for sensing the zero crossover locations of said equalized analog signal and for generating a doublet position locator signal of a fixed predetermined width indicative of each of said zero crossover locations.

4. The circuitry claimed in claim 2 wherein said singlet position locator circuitry includes an analog delay circuit for delaying said equalized analog signal by a time equivalent of substantially two detents, the output of said delay circuit being subtracted from said equalized analog signal in a differential circuit.

5. The circuitry claimed in claim 4 further including zero reference circuitry coupled to the output of said differential circuit for sensing the zero crossover locations of the differentiated equalized analog signal and for generating a singlet position locator signal of a fixed predetermined width indicative of each of said zero crossover locations.

6. The circuitry claimed in claim 5 wherein said singlet identifier includes:

first circuitry for separating positive and negative sign components of said equalized analog signal into first and second respective parallel channels;

an analog signal integrator in each of said parallel channels for integrating each signal in its respective channel; and first and second threshold circuits respectively coupled to the signal integrator in said first and second channel, each of said first and second threshold circuits having applied thereto a threshold level that enables said threshold circuits to output high level integrated singlets and reject the low level integrated doublets, the output signals from said first and second threshold circuits respectively representing positive and negative sign singlet signals.

7. The circuitry claimed in claim 6 further including third and fourth threshold circuits respectively coupled to the input terminals of said first and second channels and to a threshold level that rejects substantially all noise present in the separated positive and negative sign components of said equalized analog signal, the output signals from said third and fourth threshold circuits being applied to the analog integrator in the respective channel for integration of signals that exceed the threshold level applied to said third and fourth threshold circuits.

8. The circuitry claimed in claim 7 further including positive and negative sign singlet signal combining circuitry coupled to the outputs of said first and second threshold circuits, and pulse generating means coupled to said signal combining circuitry and responsive to said singlet position locator signals for generating timed singlet output signal pulses of predetermined fixed time duration.

9. The circuitry claimed in claim 6 wherein said doublet identifier circuitry includes:

second circuitry for separating positive and negative sign components of said equalized analog signal into third and fourth respective parallel channels;

threshold circuitry coupled into each of said third and fourth channels and to a threshold level rejecting substantially all noise existing in said separated positive and negative sign components;

first and second gate circuits coupled respectively to said third and fourth channels, said first and second gate circuits being coupled to said control signal producing means and responsive to said control signal for outputting signals representing doublets having slopes at their zero crossover locations that correspond in sign to the sign of the previous singlet; and second pulse generating means coupled to the output of said first and second gate circuits and to said doublet position locator signals for generating timed doublet output signal pulses of a predetermined width.

10. The circuitry claimed in claim 9 wherein said control signal producing means includes first and second flip-flops, each having set and reset input terminals and at least one output terminal, said first flip-flop producing a high output signal in response to either one of said positive and negative sign singlet signals, said second flip-flop producing a high output signal in response to one of said positive and negative sign signals and a low output in response to the other of said positive and negative sign signals, the output terminal of each of said first and second flip-flops being coupled to an exclusive-OR circuit, the output signal from which is said control signal.

11. The circuitry claimed in claim 1 wherein said doublet identifier circuitry includes a long interval detector coupled to the output of said receiving means and responsive to a predetermined minimum number of consecutive ternary zero symbols in said equalized analog signal for generating output signals for the control of said control signal producing means.

12. The circuitry claimed in claim 11 wherein said long interval detector provides output signals that control said control signal producing means in the absence of a controlling one of said positive and negative sign signals from said singlet identifier.

13. The circuitry claimed in claim 12 wherein said long interval detector includes:
  differential circuitry coupled to said receiving means for differentiating said equalized analog signals;
  threshold circuitry coupled to said differential circuitry for removing noise from said differentiated signals and for outputting first and second signals representing noise free positive and negative polarity portions of said signals;
  circuitry for delaying said equalized analog signals and adding said delayed signals to the undelayed analog signals and for producing absolute values of the combined negative and positive portions of said delayed and added signal;
  first and second integrators for receiving and integrating said absolute values during the period of said first and said second threshold circuitry output signals to obtain first and second integrated output signals respectively representing integrated positive and negative sign portions of said equalized analog signals; and
  first and second comparators respectively coupled to said first and second integrators and to a threshold voltage at a level between the maximum amplitude of an isolated integrated singlet signal and an integrated doublet signal, said first and second comparators outputting first and second output signals upon the occurrence of a singlet and upon the occurrence of said predetermined minimum number of consecutive ternary zero symbols detected in said equalized analog signal.

14. The circuitry claimed in claim 13 wherein said control signal producing means includes first and second flip-flops each having a signal input terminal, a clock input terminal, true and false output terminals, and set and reset terminals, said first flip-flop being reset by either positive and negative sign signals from said singlet identifier circuitry and producing therefrom a false output signal to an exclusive-OR circuit, said first flip-flop having its signal input terminal coupled to the true output terminal of said second flip-flop and being clocked by said first output signal of said first comparator, said second flip-flop being set by said positive sign signal and reset by the negative sign signal from said singlet identifier circuitry, said second flip-flop having its signal input terminal coupled to the false output terminal of said first flip-flop and being clocked by said second comparator output signal, the output terminal of said second flip-flop being coupled to said exclusive-OR circuit.

15. The method for identifying each symbol in a sequence of binary signals recorded in ternary-3-position modulation and read by a transducer as distorted analog wave shapes representing the recorded signals, said ternary-3-position modulator having a ternary 1 symbol recorded as a single flux reversal at the center of a timing detent and being read as a singlet analog signal, a ternary 2 symbol being recorded as two flux reversals within the boundaries of a detent being read as a sinusoidal shaped doublet analog signal and a ternary 0 symbol being recorded and read as the absence of flux changes in a detent, said method comprising the steps of:
  equalizing the output signal of the read transducer to reform distortions in said output signal into a sequence of equalized analog read signals;
  determining from said equalized read signals the center location in each detent containing singlets and doublets and generating singlet and doublet position locator signals, respectively, identifying said central detent locations;
  comparing the amplitudes of signals representing each singlet and each doublet in said equalized read signal sequence and generating singlet identifier signals representing the presence and positive and negative polarity sign of each singlet;
  triggering the combined positive and negative polarity sign singlets with said generated singlet position locator signals to generate timed singlet output signals;
  separating said equalized analog signals into a first channel and a second channel respectively conducting positive and negative polarity sign portions of said equalized analog signals;
  gating each of said positive and negative polarity sign portions with a control signal having a polarity sign determined by the sign of the previously detected singlet to thereby identify those doublets having half wave portions with signs that correspond to the polarity sign of the previously detected singlet; and
  triggering said identified doublets with said generated doublet position locator signals to generate timed doublet output signals.

16. The method claimed in claim 15 wherein the step of determining the central location of each detent includes the steps of:
  applying said analog read signal to a zero crossover detector and producing a doublet position locator signal pulse of predetermined width therefrom; and
  differentiating said analog read signal to shift the position of the resulting differentiated signal by approximately one detent and applying said resulting differentiated signal to a zero crossover detector and pulse generator for producing a singlet position locator signal of predetermined pulse width.

17. The method claimed in claim 16 wherein the step of comparing the amplitudes of signals representing singlets and doublets includes the steps of:
  thresholding the positive and negative polarity portions of said equalized read signal sequence at a threshold level that removes substantially all noise from the respective portions;
  integrating said positive and negative polarity portions for amplifying the amplitude differences between singlet and doublet signals; and
  comparing the integrated positive and negative portions with a threshold voltage at a level between the maximum amplitudes of an integrated doublet and integrated singlet to thereby eliminate doublet signals from the output signals of the comparator circuitry.

18. The method claimed in claim 15 including the further step of:
  providing latch circuitry responsive to said positive and negative polarity singlet identifier signals for generating said control signal, said control signal being switched to one state following the occurrence of a singlet of one polarity and to another state following the occurrence of a singlet of second polarity.

19. The method claimed in claim 18 further including the steps of:

delaying said equalized analog read signals and adding the delayed signals to said equalized read signals for detecting the occurrence of a long interval in said equalized read signal caused by a predetermined minimum number of consecutive ternary zero symbols in the recorded signal sequence;

separately integrating the positive and negative polarity portions of said delayed and added read signals over time periods limited by the respective occurrences of positive and negative portions of a differentiated analog read signal; and comparing the positive and negative integrated output signals with a threshold at an amplitude level between the maximum level of a signal representing an isolated integrated half doublet and a signal representing an integrated singlet, the output signals generated by said comparing step being applied to said latch circuitry for controlling the state of said control signal in the absence of a controlling one of the positive and negative polarity singlet identifier signals.

* * * * *